3,320,613
PULSE-COMPRESSION METHODS AND SYSTEMS

Yves Brault and Roland Carré, Paris, France, assignors to Compagnie Generale de Telegraphie Sans Fil, a corporation of France
Filed July 21, 1961, Ser. No. 128,330
Claims priority, application France, July 28, 1960, 834,223
7 Claims. (Cl. 343—17.2)

The present invention relates to pulse compression methods and systems. More particularly it is an object of the invention to provide a method and a system for compressing long pulses or for providing a plurality of pulses capable of being subsequently compressed into a single pulse, which is shorter than each one of the original pulses and for making this compresion.

A further object of the invention is to provide an arrangement incorporating the above methods and particularly adapted to be used in radar systems.

It is well known that the detection range of radar systems depends on the energy of the transmitted pulses. This energy, for a given power, depends on the durating or length of the pulses. When comparatively long pulses are transmitted, it is necessary to compress them upon reception, if the measurements are to be accurate. The long duration pulses transmitted are generally built up from linearily frequently modulated oscillation trains of constant amplitude; such pulses can be compressed by means of dispersive filters, having a convenient delay-frequency characteristic and a substantially constant attenuation in the frequency range concerned. However, such a practice is subjected to limitations, due to the fact that a high compression ratio requires a dispersive filter having a given characteristic within a wide frequency range and that such filters have a very complex structure.

According to the invention, $n$ trains of oscillations corresponding in time to $n$ portions resulting from the splitting of a frequency modulated reference pulse capable of being converted into a short pulse by means of a device imparting to each instantaneous frequency a delay $\tau(\omega)$, $\omega$ being the angular frequency, are compressed into a single pulse in the following manner:

the delays $\tau(\omega)$ are imparted to the instantaneous frequencies of the oscillation trains partly by delay devices presenting a constant delay for the whole of the train and partly by dispersive filters;

the $n$ trains of oscillation thus obtained are added to each other.

The invention will be best understood from the following description and appended drawings, wherein.

According to the invention, $n$ long pulses $I_1, I_2 \ldots I_n$ are provided which correspond to portions obtained by splitting a pulse $I_0$, which is modulated in frequency according to a law $\omega(t)$, as being the angular frequency and is capable of being compressed by means of a device such as a dispersive filter having a delay-angular frequency characteristic $\tau(\omega)$ in the frequency band $\Delta\omega$ comprised between the maximum instantaneous frequency and the minimum instantaneous frequency of pulse $I_0$. Preferably, these $n$ long pulses are actually obtained by physically splitting such a pulse $I_0$ into several pulses.

It should be recalled in this respect that:

(1) a dispersive filter having the phase-shift characteristic $\varphi(\omega)$ has a delay characteristic $$\tau(\omega) = \frac{d\varphi}{d\omega}$$

where $d\varphi/d\omega$ is the derivative of the function $\varphi(\omega)$ with respect to the angular frequency $\omega$.

(2) the pulse obtained by compressing a pulse by means of a dispersive filter has the same shape and the same duration if all the delays are increased by a constant.

According to the invention, the delay $\tau(\omega)$ is obtained for each instantaneous frequency in the following way:

$$\tau(\omega) = \tau_i(\omega) + \tau_{vi}(\omega)$$

where delay $\tau_i(\omega)$ is obtained by means of delay devices, for example delay lines, subjecting all the instantaneous frequencies of a train to the same delay, and delay $\tau_{vi}(\omega)$, is obtained by means of one or more dispersive filters. However, delay $\tau(\omega)$ may be obtained by using only dispersive filters in so far as one or more trains are concerned. In addition those delays may be imparted in any order and associated with other operations, the overall result of which does not affect the relative delays and the relative frequency differences between the instantaneous frequencies.

The addition of the $n$ pulses so obtained results in a single short pulse which is identical to the pulse $I'_0$, which would be obtained through applying pulse $I_0$ to a dispersive filter having a characteristic $\tau(\omega)$ in all the range $\Delta\omega$ of the instantaneous frequencies of $I_0$.

This is quite exactly so if the $n$ initial oscillation trains are adjacent slices of pulse $I_0$, and remains approximately so if there are small gaps between said slices.

The proposed method and system have the following advantages:

(1) Each of the dispersive filters used needs to have the desired delay characteristic $\tau(\omega)$ only in an interval $\Delta\omega_1$ which is narrower than the interval $\Delta\omega$ corresponding to the whole of pulse $I_0$.

(2) Two opposite frequency translations, effected, respectively, before and after the dispersive filtering of a train of oscillations, makes it possible to perform all the filterings in the lower frequency range of $I_0$.

The above two possibilities result in simplifying the filter construction.

(3) It is possible to use $n$ distinct transmission channels for all or part of the path followed by the pulse before the addition.

The process and system of the invention present a particular interest in radar techniques, where it is desired to generate by means of several tubes, the energy giving use to a single short pulse in the receiver, since the instantaneous power and the average power which it is possible to extract from a tube are limited.

Figure 1:
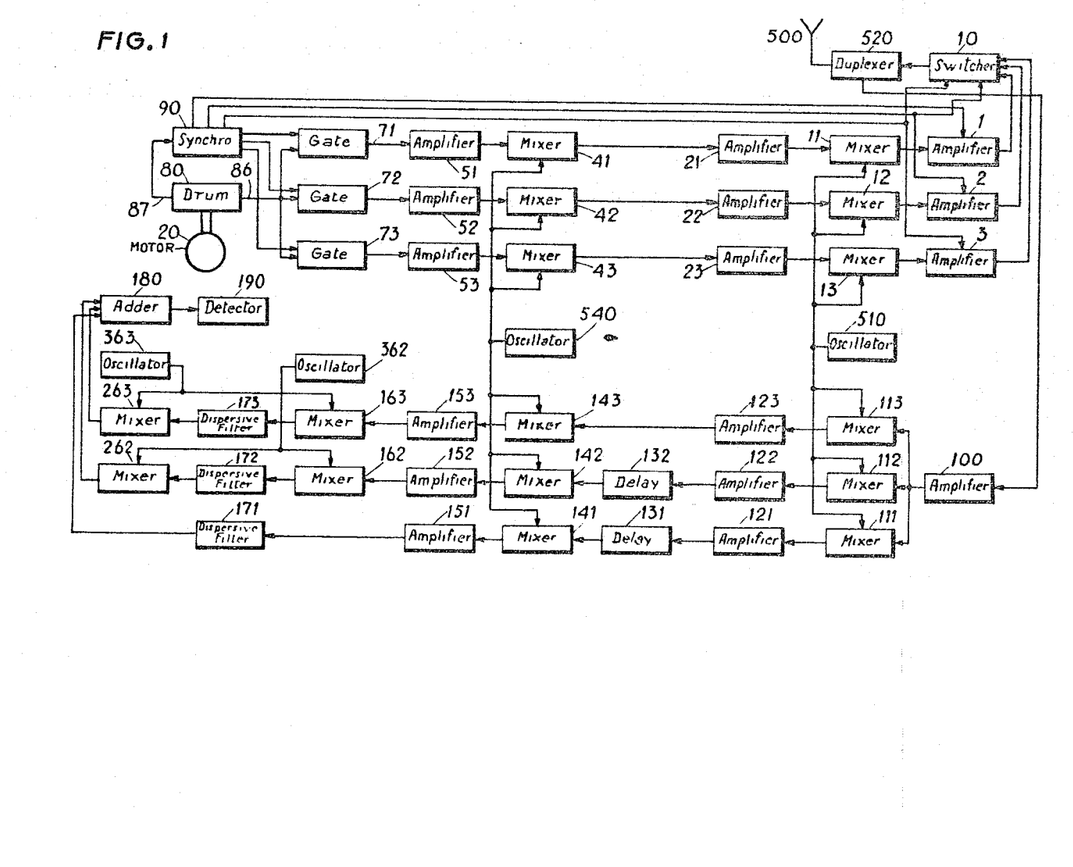
FIG. 1 is a block-diagram of a radar system according to the invention.

In the embodiment illustrated in FIG. 1, the $n$ trains of oscillations transmitted $I_1, I_2 I_n$ correspond, previous to their frequency translation, to $n$ pulse portions, resulting from the splitting of a pulse $I_0$ constituted by a constant amplitude train of oscillations, linearly frequency modulated, according to the law:

$$\omega = \omega_0 + kt$$

where $k$ is a positive constant between times $-T$ and $+T$ and $\omega_0$ is the value of the angular frequency $\omega$ at time $t=0$.

It is known that such a pulse may undergo a maximum compression by causing it to pass through a dispersive filter, the delay law of which is given by the following relation:

$$\tau_0(\omega) = B_0 - \frac{\omega - \omega_0}{k}$$

where $\tau_0$ is the value of delay $\tau$ imparted to pulse $I_0$ $B_0$ being a constant. Since $\omega-\omega_0=kt$, this law corresponds to $t+\tau_0(\omega)=B_0$.

There is thus obtained at the output of the dispersive filter a short pulse, the envelope of which is of the form $\sin x/x$ and the duration of which, between the first minima, is equal to $1/kT$, the peak of this short pulse occurring at the output of the filter at an instant $\Theta$ which is later by $B_0$ than that at which the center frequency $\omega_0$ of the input pulse is applied to the filter.

The invention will be described assuming that $n=3$, but it is to be understood that this value, as well as all other numerical values mentioned, are not limitative and are given only by way of example.

Pulse $I_0$ may be obtained in any known manner, provided it is frequency modulated with a good linearity.

In the example considered, this pulse has been recorded beforehand on the signal track of a magnetic drum 80 driven by a motor 20 with a feed-back control providing for a constant rotation speed. The recording has been effected at a speed substantially lower than the reading speed, thus ensuring a good linearity of the frequency modulation.

Drum 80 comprises a second track on which a synchronizing signal is recorded. It comprises two outputs 86 and 87 respectively connected to two reading heads, corresponding to the signal track and to the synchronization track.

Output 87 feeds a synchronization and unblocking system 90 comprising synchronization circuits and gating generators. Three outputs of system 90 are respectively connected to the control inputs of gates 71, 72 and 73.

Each one of the transmission channels comprises in series:

an initial frequency amplifier 51, 52 and 53;
a mixer 41, 42 or 43;
an intermediate frequency amplifier 21, 22 or 23;
a mixer 11, 12 or 13;
a transmission frequency amplifier 1, 2 or 3, each of which is, for example, a high-power klystron, and each of which is connected to an output of the synchronization and unblocking system 90.

These three amplifiers 1, 2, 3 have their outputs connected to a ferrite switching device 10, arranged for directing to the output thereof the output energy of amplifiers 1, 2 and 3. This device is connected to two outputs of device 90 also connected to amplifiers 2 and 3. The output of the switching device 10 is connected to a duplexer 520, which is in turn connected to an aerial 500.

This aerial feeds, through duplexer 520 a radio frequency amplifier 100, which is the input stage of the receiver.

The outputs of amplifier 100 feed three receiver channels, each comprising in series a mixer 111, 112 or 113 and an intermediate frequency amplifier 121, 122 or 123, respectively.

Amplifier 123 is directly connected to a mixer 143, whereas amplifiers 122 and 121 are connected to mixers 142 and 141, respectively, through delay devices 132 and 131, for example, of the type comprising ultrasonic lines.

The three mixers 141, 142 and 143 are connected to initial frequency amplifiers 151, 152 and 153, respectively.

Amplifiers 151, 152, 153 are, in turn connected to identical dispersive filters 171, 172, 173. Amplifier 151 is directly connected and the other two are connected through mixers 162 and 163.

The dispersive filters 172, 173 are followed by mixers 262, 263, respectively.

The outputs of mixers 262 and 263 and of the dispersive filter 171 feed an adder 180, which is connected to a detector 190, which supplies an indicator device (not illustrated), this indicator also receiving a synchronizing signal from device 90.

The circuit comprises, in addition, the following beating oscillators:

oscillator 510 which supplies in phase mixers 13 and 113, 12 and 112, 11 and 111,
oscillator 540 which supplies in phase mixers 41 and 141, 42 and 142, 43 and 143,
oscillator 362 which supplies in phase mixers 162 and 262
oscillator 363 which supplies in phase mixers 163 and 263.

It should be noted that the number of intermediate frequencies between the initial and the transmission frequencies will be generally higher than 1. The case where a single intermediate frequency is used has been shown only for the sake of simplicity.

The operation of the device will be explained with reference to the diagram of FIG. 2, wherein the time is plotted along the abscissae and the frequencies along the ordinates. In order to provide a better comparison of the frequency-time curves, the various periods considered during the operation are related to the same origin of time.

A pulse $I_0$, at the initial frequency, having a duration $D_0$, which may be, for example, $3000\mu s$, has been recorded on the magnetic drum 80. It consists of a train of oscillations, which are linearly modulated in frequency according to an increasing law as shown by straight line AE (FIG. 2). The extreme frequencies corresponding to points A and E differ by 3M (where M is, for example, equal to 100 kc./s). The central frequency $f_2=f_0$, where $f_0=2\pi\omega_0$, corresponding to the middle of segment AE is, for example, equal to 200 kc./s.

The synchronization system 90 ensures the successive unblocking of the three gates 71, 72, 73. These gates receive at their other input the output signal of output 86 or drum 87 to provide at their outputs, the first third, the second third and the last third of pulse $I_0$, respectively, i.e. three equal portions $I_1$, $I_2$, $I_3$, having a duration $D=D_0/3$; for each one thereof, the frequency excursion is only $M=100$ kc./s.

Figure 2:
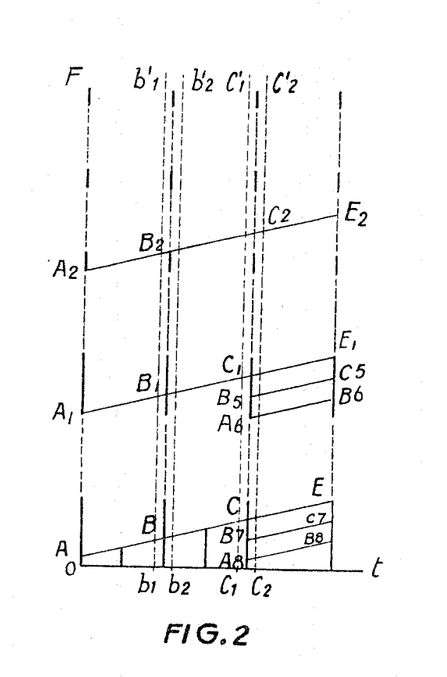
FIG. 2 is a diagram illustrating the operation of the radar system shown in FIG. 1.

The frequency-time curves of pulses $I_1$, $I_2$, $I_3$ are the segments AB, BC, CE (FIG. 2), whereas the central angular frequencies of pulses $I_1$, $I_2$ and $I_3$ are, respectively, $\omega_1$, $\omega_2=\omega_0$ and $\omega_3$ where $\omega_1$, $\omega_2=\omega_0$ and $\omega_3$ correspond to the frequencies $f_1$, $f_2=f_0$, and $f_3$ shown in FIG. 2.

Pulses $I_1$, $I_2$, $I_3$ are amplified by amplifiers 51, 52, 53, respectively, then translated to the intermediate frequency level, in mixers 41, 42, 43, fed by the same beating oscillator 540 the frequency of which is, for example, 30 mc./s. The corresponding frequency-time curves are then given by segments $A_1B_1$, $B_1C_1$, $C_1E_1$ in FIG. 2.

After amplification by amplifiers 21, 22 and 23 pulses $I_1$, $I_2$, $I_3$ are translated to their transmission frequencies, in mixers 11, 12, 13 which are fed by beating oscillator 510, the corresponding frequency-time curves being then $A_2B_2$, $B_2C_2$, $C_2E_2$.

The three pulses thus obtained are transmitted sequentially, amplifiers 1, 2 and 3 being unblocked at the same time as gates 71, 72, 73, respectively, by the synchronization system 90. The respective output signals of amplifiers 1, 2 and 3 are applied to duplexer 520 by means of the ferrite switch 10 which, in the absence of any synchronizing signal, directs the energy from amplifier 1 onto duplexer 520. Under the control of the signals which it receives from system 90, switch 10 directs in turn to duplexer 520 the energy supplied by amplifiers 2 and 3.

At the reception, the reflected pulses $I_1$, $I_2$, $I_3$ are amplified by means of amplifier 100.

In the case of stationary targets, the frequency-time curves of the echoes received are still given by the straight segments $A_2B_2$, $B_2C_2$ and $C_2E_2$.

The pulses received are then translated to the intermediate frequency, and separated, in mixers 111, 112 and 113 which are fed by the beating oscillator 510, and their frequency-time curves correspond to segments $A_1B_1$, $B_1C_1$ and $C_1E_1$ in FIG. 2.

The pulses $I_1$ and $I_2$ are then delayed by 2D and D, respectively, in delay lines 131 and 132, which results in the coincidence in time of the frequency-time curves of echoes $I_1$, $I_2$, $I_3$ along lines $C_1E_1$, $B_5C_5$ and $A_6B_6$.

The echoes are then translated in the three channels to the initial frequency respectively in mixers 141, 142 and 143 which are fed by the beating oscillator 540. The resulting frequency-time curves are CE, $B_7C_7$ and $A_8B_8$.

The echoes of pulses $I_2$ and $I_3$ have their frequencies lowered by $M=100$ and $2M=200$ kc./s., respectively, in mixers 162 and 163 which are fed by the beating oscillators 362 and 363. The three frequency-time curves now coincide with segment $A_8B_8$.

It will be noted that the frequency translations performed up to this point have not modified on the whole the relative delays between the components of a given pulse and that the relative delays between the components of different pulses have been modified only by the frequency translation performed in mixers 162 and 163.

Each echo consists of a train of oscillations which is linearly modulated in frequency with a total frequency excursion of M kc./s.

The three pulses corresponding to curve $A_8B_8$ are compressed in the dispersive filters 171, 172 and 173, respectively, which are centered on the central angular frequency $\omega_1$ of AB. The filters impart to the various frequencies a delay $$\tau_v(\omega) = B_0 - (\omega - \omega_1)/k$$

The compressed pulses corersponding to pulses $I_2$ and $I_3$ are then respectively subjected, in mixers 262 and 263 also fed by the beating oscillators 362 and 363, respectively, to a frequency translation which is opposite to that effected before the filtering, thus cancelling the phase-shifts introduced thereby. The delays obtained for the instantaneous frequencies of the second and third pulse portions are equal to those which would have been obtained if the double frequency conversion effected by means of the beating oscillators 362 and 363 were eliminated and the dispersive filters used for said second and three pulse portions, while having the same bandwidth as filters 172 and 173 were respectively centered on the central angular frequencies $\omega_2$ and $\omega_3$, with the respective delay characteristics $$B_0 - \frac{(\omega - \omega_2)}{k} \text{ and } B_0 - \frac{(\omega - \omega_3)}{k}$$

Finally, taking into account the delays due to lines 132 and 131, the instantaneous frequencies of pulse $I_1$ have been delayed by:

$$2D + B_0 - \frac{(\omega - \omega_1)}{k} = 2D + B_0 - \frac{(\omega - \omega_0)}{k} - \frac{(\omega_0 - \omega_1)}{k}$$

$$= 2D + B_0 - \frac{\omega - \omega_0}{k} - D = \tau_0(\omega) + D$$

The frequencies of pulse $I_2$ have been delayed by:

$$D + B_0 - \frac{(\omega - \omega_2)}{k} = D + B_0 - \frac{(\omega - \omega_0)}{k} = \tau_0(\omega) + D$$

(since $\omega_2 = \omega_0$).

And those of pulses $I_3$ have been delayed by:

$$B_0 - \frac{(\omega - \omega_3)}{k} = B_0 - \frac{(\omega - \omega_0)}{k} - \frac{(\omega - \omega_3)}{k} = \tau_0(\omega) + D$$

By adding the three compressed pulses, a short pulse is provided which is identical to that which would be provided by the dispersive filtering of pulse $I_0$ in a single filter having the delay characteristic $$\tau_0(\omega) = B_0 - \frac{(\omega - \omega_0)}{k}$$

in the frequency interval covered by $I_0$.

This pulse is detected by detector 190 and applied to the indicator which receives from device 90 a synchronization signal suitably shifted with respect to the beginning of the transmission, in order to take into account the total amount of time by which the beginning of the pulse is delayed on account of the compression operations.

It has been assumed, up to the present, that the echoes received derive from a stationary target. If a mobile target is considered, the variation $\omega_d$ of the angular frequency due to the Doppler effect is substantially the same for all the frequencies transmitted which differ only by the initial frequency modulation. This would correspond, in FIG. 2, to a translation equal to $\omega_d$, parallel to the axis of frequencies of the various curves ($A_2B_2$, $B_2C_2$, $C_2E_2$, $A_1B_1$, $B_1C_1$, $C_1E_1$, $B_5C_5$, $A_6B_6$, CE, $B_7C_7$, $A_8B_8$) obtained at the reception.

The dispersive filters used at the reception operate in this case with frequencies shifted by $\omega_d$ with respect to the angular frequencies in the absence of the Doppler effect, which, given the law of the filters used, is tantamount to assigning to each instantaneous frequency an additional delay which is constant for all the frequencies. On the other hand, the shifting of each frequency by the same value $\omega_d$ is equivalent to a frequency translation and does not modify the duration of the final pulse obtained at the output of the adder.

The bandwidth of the dispersive filters must of course be sufficiently large to cover the shifting of the frequencies due to the Doppler effect, this shifting being, however, small with respect to the bandwidth required by the frequency excursion of the input pulse.

It has been mentioned that pulses $I_1$, $I_2$, $I_3$ were separated in mixers 111, 112 and 113. It will be readily apparent that this separation cannot be quite conveniently effected in the intermediate frequency mixers, since the frequency bands covered by the pulses are adjacent to one another.

According to a preferred embodiment of the invention, the pulses are curtailed in the transmission stage, pulse $I_2$ being reduced by about 10% of its length at both ends, and pulses $I_1$ and $I_3$ by similar lengths at the ends thereof adjacent to pulse $I_2$, i.e. along parallel vertical lines $b_1b'_1$, $b_2b'_2$, $c_1c'_1$, $c_2c'_2$ in FIG. 2. All the subsequent curves are then limited by these straight lines.

This shortening is effected, for example, by means of the unblocking signals of amplifiers 1, 2 and 3, which are arranged as to cover shorter time intervals than those corresponding to the unblocking of coincidence circuits 71, 72 and 73.

The subsequent operation of the receiver device is not modified, since the frequencies are correctly regrouped. However, certain instantaneous frequencies of pulse $I_0$ will be absent, the envelope of the pulses collected at the output of filters 171, 172 and 173, and at the output of adder 180 will be slightly modified and the energy will be slightly less concentrated.

It has been shown that the action of the Doppler effect on the compression is negligible on account of the fact that it results in modifying, by the same value $\delta$, which is proportional to the velocity V of the target, the delays imparted to the various frequencies.

This results however in a range error on the indicator, since the additional delay due to the Doppler effect, which delay is a function of the velocity of the target, is not corrected by the shifting of the synchronization signal applied to the indicator.

In the equipment of the invention, the method may be used which consists in reversing in each transmission channel the law of modulation of the pulse by resorting to a subtractive mixing in one of the intermediate frequency mixers as, if $\omega(t)$ is an increasing function of time, $-\omega(t)$ is a decreasing function and the same holds true respectively for $\Omega_{b1}+\omega(t)$ and $\Omega_{b2}-\omega(t)$ where $\Omega_{b1}$ and $\Omega_{b2}$ are intermediate heat frequencies respectively mixed with $\omega(t)$ and $-(\omega t)$, in the case of FIG. 1, in the single intermediate frequency mixer, and effecting the opposite translation in the respective reception channels. As a result, the frequency shift due to the Doppler effect changes its direction and the error $\delta$ is replaced by $-\delta$.

By alternately transmitting the normally modulated pulses and pulses modulated in a reverse manner, two spots are obtained on the indicator; the middle point of the line joining these two spots corresponding to the actual range and the distance between these two spots being proportional to the velocity of the target.

In order not to modify the transmitted frequencies, it is preferable to use two beat frequencies $\Omega_{b1}$ and $\Omega_{b2}$ such that $\Omega_{b2}-\Omega_{b1}=\omega_1+\omega_3$, $\Omega_{b1}$ being utilized for the additive mixing providing the normal modulation law, and $\Omega_{b2}$ for the subtractive mixing. These two frequencies may be delivered by the same generator followed by two frequency multiplication chains, the operation of the mixer with one or the other of the two corresponding frequencies being effected by means of a control device comprising a bistable multivibrator receiving a synchronizing signal from device 90.

The embodiment illustrated in FIG. 1 may undergo numerous modifications and variations, obvious for those skilled in the art, such as for instance:

the initial pulse may be obtained in different ways, for example, by dispersive filtering of a short pulse, this filtering resulting in the stretching of the pulse, or by direct production at each transmission of a frequency modulated pulse;

it follows from the above, that instead of three identical filters 171, 172 and 173, three filters centered on $\omega_1$, $\omega_2$, $\omega_3$ respectively may be used, while suppressing elements 162, 163, 262, 362 and 363 from the circuit. It is however desirable to use identical filters centered on the lowest of the three frequencies $\omega_1$, $\omega_2$ and $\omega_3$, as shown in FIG. 1;

it is only on account of technological reasons that the delays are applied preferably at the intermediate frequency in the circuit of FIG. 1; these delays may also be applied to other stages, with appropriate delay devices. If these delays are applied after the dispersive filtering compressions, a single filter may be used, provided that, as in the case of FIG. 1, two opposite frequency transpositions are effected, before and after the filtering, on $(n-1)$ of the $n$ echoes.

Figure 3:
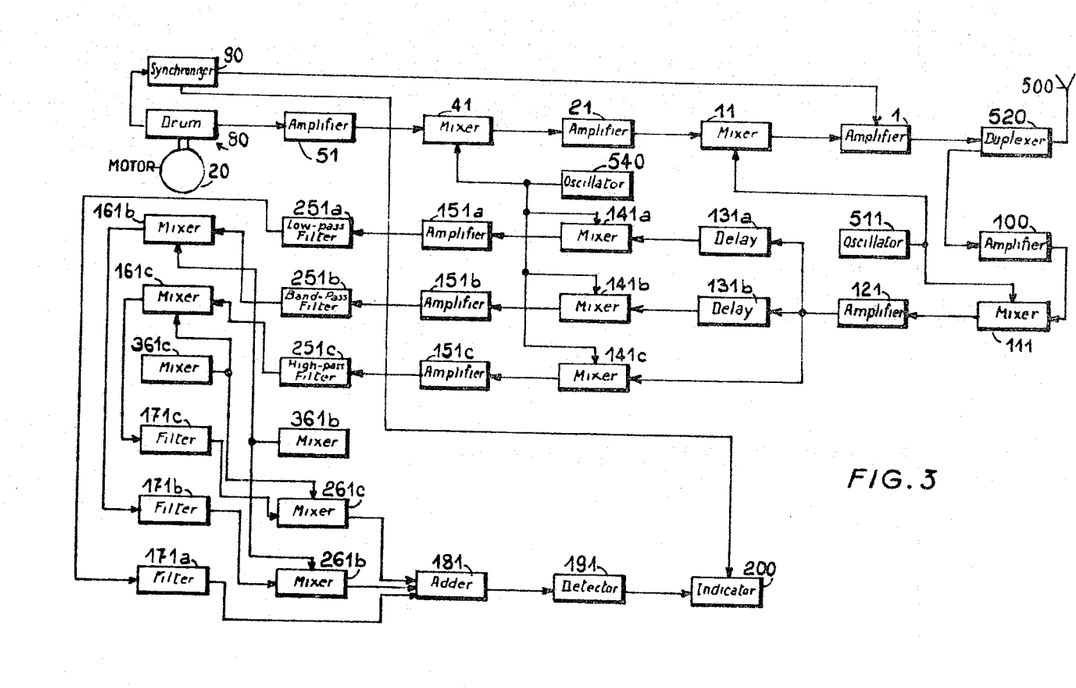
FIGS. 3 and 4 are block-diagrams of other radar systems according to the invention.

FIG. 3 is an alternative embodiment of the invention using only one transmission channel. The elements 20, 80, 90, 51, 41, 21, 11, 1, 520, 500 are identical to the elements in FIG. 1, carrying the same references.

A pulse $I_0$ identical to that used in the system of FIG. 1 is recorded on the signal track of drum 80. The beating oscillator 540 feeds mixer 41 and the beating oscillator 511 feeds mixer 11. With respect to the first channel of FIG. 1, the difference consists in the elimination of gate 71 and switch 10 which are now useless.

The reception channel comprises a high frequency amplifier 100, followed by a mixer 111 which is fed in phase with mixer 11 by oscillator 511.

Mixer 11 is followed by an intermediate frequency amplifier 121, the output of which supplies in parallel mixers 141–$a$, 141–$b$ and 141–$c$, the first through a delay line 131–$a$ providing a delay 2D, the second through a delay line 131$b$ providing a delay D. The oscillator 540 feeds in phase mixers 41, 141–$a$, 141–$b$ and 141–$c$.

Mixer 141–$a$ is followed by an amplifier 151–$a$, a low-pass filter 251–$a$ and a dispersive filter 171–$a$. Mixer 141$b$ is followed by an amplifier 151–$b$, a pass-band filter 251–$b$, a mixer 161–$b$, a dispersive filter 171–$b$ and a mixer 261–$b$.

Mixer 141–$c$ is followed by an amplifier 151–$c$, a high-pass filter 251–$c$, a mixer 161–$c$, a dispersive filter 171–$c$ and a mixer 261–$c$.

The pass-band of filter 251–$b$ corresponds to the second third of the pulse $I_0$, at the initial frequency, filters 251–$a$ and 251–$c$ covering the lower and higher frequencies.

Mixers 161–$b$ and 261–$b$ are fed in phase by the same beating oscillator 361–$b$ and mixers 161–$c$ and 261–$c$ are fed in phase by the same beating oscillator 361–$c$.

The outputs of mixers 261–$b$ and 261–$c$ and of the dispersive filter 171–$a$ feed the inputs of an adder 181 the output of which is coupled to a detector 191 coupled to an indicator 200. The latter is connected to an output of the synchronizing system 90.

The operation of the device is as follows: in the transmission and in the reception channels, up to amplifier 121, the operation is the same as in the first transmission channel and the first reception channel of FIG. 1, except that a complete pulse $I_0$, and not only one third thereof, is transmitted, then received, the amplifier 51 receiving the complete signal resulting from the reading of this pulse and amplifier 1 being unblocked during the total reading time.

The pulse received is however divided in three channels at the output of the intermediate receiver frequency amplifier 121, to produce an undelayed pulse $I_c$ in channel $c$, a pulse $I_b$ delayed by D in channel $b$, and a pulse $I_a$ delayed by 2D in channel $a$. The three pulses are translated to the initial frequency in mixers 141–$a$, 141–$b$, 141–$c$ and amplified. The low-pass filter 251–$a$ passes only the first portion of $I_a$ corresponding to its first third, in the absence of the Doppler effect; the band-pass filter 251–$b$ passes only the central portion of $I_b$ which corresponds to the second third, in the absence of the Doppler effect, the high-pass filter 251–$c$ passes only the last portion of $I_c$ which corresponds to the third third, in the absence of the Doppler effect. The result is the same as if pulse $I_0$ had been first split into three portions, the first being then delayed by 2D, the second by D and the third not delayed at all.

Since the delay is more readily provided at the intermediate frequency and the splitting of the pulses more readily performed at the initial frequency, the delaying precedes in this case the splitting.

The central portion $I_b$ and the last portion of $I_c$ have then their frequencies lowered by M kc./s and 2 M kc./s in mixers 161–$b$ and 161–$c$, respectively; they are then compressed by passing through the dispersive filters 171–$b$ and 171–$c$, identical to filter 171–$a$ wherein the first portion of $I_a$ is compressed, these three filters being themselves identical to filters 171, 172 and 173 of FIG. 1. The central portion of $I_b$ and the last portion of $I_c$ undergo then in mixers 261–$b$ and 261–$c$, respectively, frequency conversions opposite to those effected in mixers 161–$b$ and 161–$c$, respectively, and the pulses of three channels are added to each other in adder 181, the resulting pulse being detected in detector 191 and applied to indicator 200.

It is readily seen, by reasoning as in the case of FIG. 1, that the Doppler effect does not substantially affect the compression, provided that the operating band of the dispersive filters 171–$a$ and 171–$c$ shows a sufficient margin; the three output pulses of filters 251–$a$, 251–$b$ and 251–$c$ have then slightly unequal durations.

Figure 4:
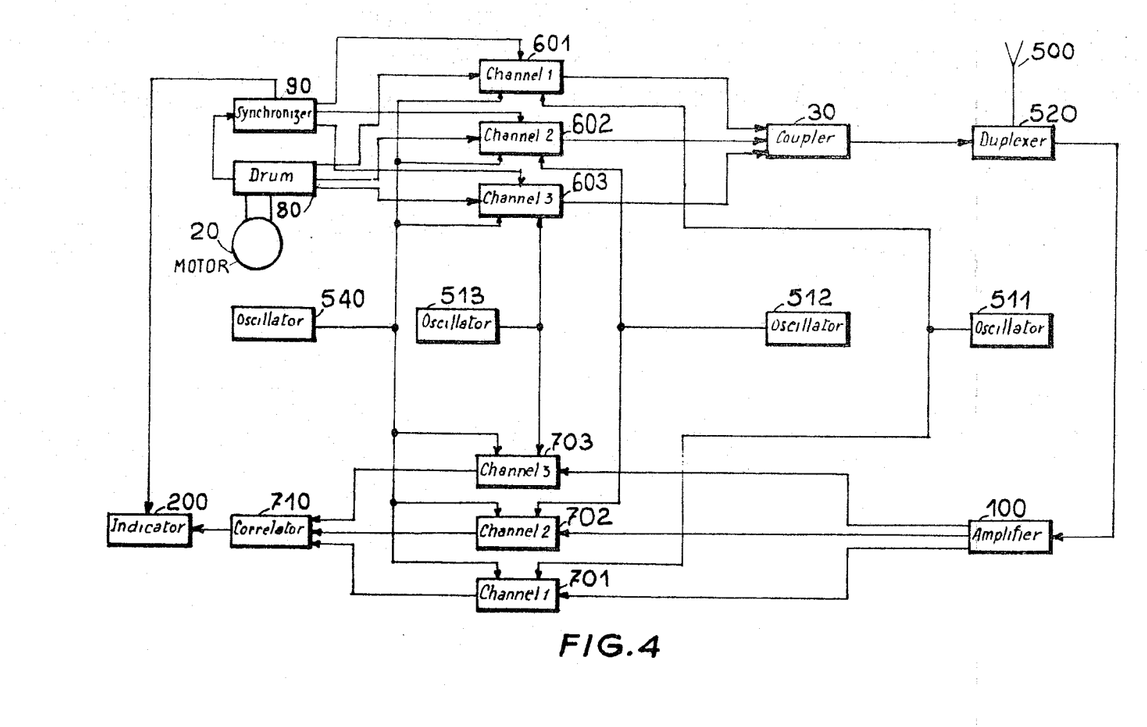

FIG. 4 illustrates a radar station combining the system shown in FIG. 3 with a frequency diversity system.

The system shown in FIG. 4 comprises drum 80, motor 20 and the synchronization and unblocking device 90. In the present instance, however, drum 80 includes three signal tracks, on each of which is inscribed a pulse of the type $I_0$, which is frequency modulated according to the law $\omega=\omega_0+kT$ between $-T$ and $+T$, the time T and the coefficient $k$ having, respectively, the values $T_1$, $T_2$, $T_3$ and $k_1$, $k_2$, $k_3$ for each one of the three pulses $J_1$, $J_2$, $J_3$ and the times $T_1$, $T_2$, $T_3$ being such that $k_1T_1=k_2T_2=k_3T_3$.

The three pulses are recorded on the drum in such a way that the central frequencies of the different pulses be read at instants slightly shifted with respect to one another as will be indicated hereinafter.

The outputs of the reading heads associated with these three signal tracks feed the three channels 601, 602, 603, respectively; channel 601 comprises the elements 51, 41, 21, 11 and 1 of FIG. 1 and channels 602 and 603 comprise corresponding elements 52, 42, 22, 12, 2 and 53, 43, 23, 12, 3, respectively.

The mixers 41, 42 and 43 are fed by the same heterodyne oscillator 540, while mixers 11, 12 and 13 are fed by the different beating oscillators 511, 512 and 513, respectively, thus providing in the three channels respective frequency translations by $\Omega_1$, $\Omega_2$ and $\Omega_3$, those three frequencies being separated by intervals of the order of, for example 10 M c./s., which allow an easy separation of the corresponding pulses at the reception, and the multi-coupling of the three channels with the duplexer 520. The constants $k_1$, $k_2$, $k_3$, fulfill the conditions:

$$\frac{k_1}{\Omega_1}=\frac{k_2}{\Omega_2}=\frac{k_3}{\Omega_3}$$

Elements 1, 2, 3 of the channels 601, 602, 603 are connected to different outputs of system 90.

The outputs of these three channels feed the hybrid junctions coupling system 30, the output of which feeds duplexer 520 connected to aerial 500.

Duplexer 520 feeds a radio frequency amplifier 100, the three outputs of which feed in parallel three channels 701, 702 and 703. Channel 701 comprises all the elements of the three-branch receiving channel of FIG. 3, from mixer 111 to detector 191, including these two last elements. Channels 702 and 703 are identical, their first mixers 112 and 113, however, being fed by beating oscillators 512 and 513, respectively, whereas mixers 141–a, 141–b, 141–c; 142–a, 142–b, 142–c; 143–a, 143–b, 143–c of the three branches of each of the three channels 701, 702 and 703 are fed by beating oscillator 540. Finally, the dispersive filters 171–a, 171–b, 171–c; 172–a, 172–b, 172–c; 173–a, 173–b, 173–c, are identical for the three branches of each of the channels 701, 702, 703, but different for each channel, their frequency-delay characteristics being, respectively:

$$B_1=\frac{\omega-\omega_1}{k_1},\ B_2=\frac{\omega-\omega_1}{k_2}\text{ and }B_3=\frac{\omega-\omega_1}{k_3}$$

where the frequency $\omega_1$ is the central frequency of the first thirds of pulses $J_1$, $J_2$, $J_3$ recorded on magnetic drum 80. The delay lines 131–a, 131–b; 132–a, 132–b; 133–a, 133–b of the three channels impart respective delays $2D_1$, $D_1$, $2D_2$, $D_2$, $2D_3$, $D_3$, where $$D_1=\frac{2T_1}{3},\ D_2=\frac{2T_2}{3},\ D_3=\frac{2T_3}{3}$$

The outputs of the three channels 701, 702, 703 are connected to a correlating device 710, of any known type, the output of which is connected to indicator 200 which is also connected to an output of synchronizing system 90.

The operation of the device is as follows: the three high frequency pulses corresponding to the pulses $J_1$, $J_2$, $J_3$ recorded on drum 80, are transmitted by amplifiers 1, 2 and 3 unblocked by means of the signals delivered by device 90.

The echo pulses are received, frequency translated and separated by means of mixers 111, 112, 113 of chains 701, 702, 703. Then each pulse is compressed and detected in the manner indicated with reference to FIG. 3.

It is essential to mention at this point that if the dispersive filters of the different channels consist of a different number of identical cells, the constant coefficients $B_1$, $B_2$ and $B_3$ of their delay characteristic are also different. Besides as $T_1$, $T_2$ and $T_3$ are different, $D_1$, $D_2$ and $D_3$ are also different.

As a consequence thereof and considering for instance the central frequencies of the pulses received in the three channels 701, 702 and 703, these central frequencies $\omega_0$, in the absence of the Doppler effect, will undergo, on account of the compression operations, overall delays respectively equal to $$\tau_1=B_1+D_1\text{ in channel 701}$$
$$\tau_2=B_2+D_2\text{ in channel 702}$$
$$\tau_3=B_3+D_3\text{ in channel 703}$$

In order that the peaks of the three short pulses be obtained simultaneously at the outputs of the three channels 701, 702, 703 these central frequencies are transmitted at the instant $t_{01}$, $t_{02}$, $t_{03}$ such that $$t_{01}+B_1+D_1=t_{02}+B_2+D_2=t_{03}+B_3+D_3$$

the three pulses $J_1$, $J_2$, $J_3$ are therefore recorded accordingly on drum 80.

It is obvious that these three short pulses may also be obtained simultaneously by other methods. For example, the three central frequencies may be transmitted simultaneously and the differences between $\tau_1$, $\tau_2$ and $\tau_3$ compensated by constant additional delays common to all the frequencies in two of the reception channels.

Under these conditions, the three pulses are simultaneously received in the absence of the Doppler effect.

In the case of a target moving at a radial speed V, positive or negative, according as the target approaches or recedes from the station, the various instantaneous frequencies of pulse $J_1$ will suffer a frequency shift, due to the Doppler effect, equal to:

$$\frac{2V(\Omega_1+\omega)}{c}=\frac{2V\Omega_1}{c}+\frac{2V\omega}{c}$$

where the term $2V\omega/c$ is negligible. However, on account of the shift $2V\Omega_1/c$, the instantaneous frequencies, while passing through the dispersive filters 171–a, 171–b and 171–c, undergo an additional delay—designated herein as the Doppler delay—equal to $2V\Omega_1/k_{1c}$.

In the same way, the instantaneous frequencies of pulse $I_2$ undergo a Doppler delay equal to $2V\Omega_2/k_{2c}$ and those of pulse $I_3$ a Doppler delay equal to $2V\Omega_3/k_{3c}$.

Since the coefficients $k_1$, $k_2$ and $k_3$ have been selected so that $$\frac{\Omega_1}{k_1}=\frac{\Omega_2}{k_2}=\frac{\Omega_3}{k_3}$$

the Doppler delays of the three pulses, whatever the value of V, will be equal, so that, in each case, the short pulses will be obtained simultaneously at the outputs of the chains 701, 702, and 703, also in the case of a moving target. The range error made may be corrected as mentioned hereinbefore.

The short pulses simultaneously obtained may therefore be used in the correlating device 710 of any known type according to one of the known diversity techniques: In the figure, this circuit has only one output and feeds only one indicator. This example is, however, non limitative, several correlator systems may be used, the outputs of which feed distinct indicators.

The device illustrated in FIG. 4 may undergo various modifications, for example, the three pulses $J_1$, $J_2$ and $J_3$ at the initial frequency may be obtained in the transmitter by starting from a single pulse $J_1$, recorded on drum 80 or produced by any other means, feeding pulse $J_1$ of the type $\omega=\omega_0+k_1t$, $(-T<t<T)$ to the three transmitting channels, pulse $J_1$ being then transformed by means of dispersive filters having a linear delay-frequency characteristic respectively into a pulse $J_2$ of the type $\omega=\omega_0+k_2(t-t_2)$, with $T_2<t-t_2<T_2$ in the second channel, and into a pulse $J_3$ of the type $\omega=\omega_0+k_3(t-t_3)$, with $T_3<t-t_3<T_3$, in the third channel, with suitable delays in the reception channel for obtaining simultaneously the three short pulses at the outputs of these channels.

It will be apparent that the conditions $$\Omega_1/k_1=\Omega_2/k_2=\Omega_3/k_3$$

ensure the possibility of combining the frequency diversity radar technique with a compression of the received pulses. This result is obtained because the above conditions equalize the Doppler frequency shifts occuring in the different channels operating at different high frequencies. It is obvious that the corresponding transmitting method including the above conditions, may also be used with a conventional dispersive filtering compression at the receiver, i.e. without splitting the received pulses, each of which being then compressed in a dispersive filter having an operating band corresponding to the instantaneous frequency range of the pulse to be compressed.

It is also obvious that the three pulses $J_1$, $J_2$ and $J_3$ need not necessarily have the same center instantaneous frequency and the same instantaneous frequency range provided suitable dispersive filters are used for each of them.

A radar station according to the invention is, of course, not limited to the examples illustrated, and any type of radar or other system, using the methods and systems of the invention, is considered to lie within the scope of the invention.

What is claimed is:

1. An apparatus for compressing an initial constant amplitude pulse which is linearly frequency modulated according to an increasing law as a function of time, said apparatus comprising: means for deriving from said initial pulse linearly frequency modulated partial pulses, respectively included in the $n$ adjacent equal slices obtained through splitting of said initial pulse into $n$ equal parts, $n$ being an integer greater than one; first delay means for imparting to the first $(n-1)$ of said $n$ partial pulses respective delays to bring into time coincidence the instantaneous frequencies of said $n$ partial pulse corresponding to the center instantaneous frequencies of said $n$ slices; first frequency translating means for operating on the last $(n-1)$ of said $n$ partial pulses respective first frequency translations, making equal said instantaneous frequencies of said $n$ partial pulses corresponding to said slice center instantaneous frequencies, dispersive filtering means for compressing each of said partial pulse and second frequency translating means for effecting on said (last) $n-1$ partial pulses respective second frequency translations, respectively opposite to said first frequency translations; and adding means for adding up the $n$ compressed pulses so obtained.

2. An apparatus for compressing a frequency modulated pulse, capable of being compressed by imparting to its different instantaneous frequencies a delay which is a function of the instantaneous frequency, said apparatus comprising essentially: first means, for splitting said frequency modulated pulse into at least two partial pulses; and second means for imparting said delay to the instantaneous frequencies of each of said partial pulses, said last mentioned means having an output and comprising delay means for imparting the same delay to all the instantaneous frequencies of at least one of said partial pulses, and dispersive filtering means for filtering each of said partial pulses; and adding means for adding up the resulting pulses thus obtained at said output of said second means.

3. A radar station comprising: means for generating a linearly frequency modulated pulse; means for deriving from said pulse $n$ successive portions, $n$ being an integer; $n$ transmitting channels for respectively transmitting said $n$ portions, said transmitting channels including frequency translating means for effecting the same frequency translations in all of said channels, and having respective outputs; means for feeding said $n$ portions to said $n$ transmitting channels respectively; means coupled to said $n$ transmitting channel outputs for successively sending on the air and collecting, as reflected echoes from a target, said $n$ portion; $n$ receiving channels coupled to said sending and collecting means, for respectively receiving said $n$ portions, each of said channels comprising frequency translating and selecting means for selecting one of said $n$ portions and for effecting the frequency translations opposite to those effected in the transmitting channels, each of said channel comprising means, including a dispersive filter, for deriving a compressed pulse from the portion associated therewith, and the first $(n-1)$ of said receiving channels including respective delay means adapted to ensure the coincidence in time of the said compressed pulses of all channels; an adder coupled to said receiving channels for adding said $n$ compressed pulses and a detector.

4. A radar station comprising: means for generating a linearly frequency modulated pulse; means for deriving from said pulse $n$ successive portions, $n$ being an integer; $n$ transmitting channels for respectively transmitting said $n$ portions, said transmitting channel including frequency translating means for effecting the same frequency translations in all of said channels, and having respective outputs; means for feeding said $n$ portions to said $n$ transmitting channels respectively; means coupled to said $n$ transmitting channel outputs for successively sending on the air and collecting, as reflected echoes from a target, said $n$ portions; $n$ receiving channels coupled to said sending and collecting means, for respectively receiving said $n$ portions, each of said channels comprising frequency translating and selecting means for selecting one of said $n$ portions and for effecting the frequency translations opposite to those effected in said transmitting channels, each of said $n$ receiving channels comprising a dispersive filter having the same frequency operating range in all of said receiving channels, the last $(n-1)$ of said channels comprising additional first and second frequency translating means respectively located before and after said dispersive filter, said first additional frequency translating means operating, on the portion propagating through said channel, a frequency translation bringing its instantaneous frequency range into the operating range of said dispersive filter, and the first $(n-1)$ of said receiving channels including respective delay means operating at an intermediate frequency stage and imparting respective delays adapted to ensure the coincidence in time of the output signals of said dispersive filters of said $n$ channels; an adder coupled to said receiving channels for adding the output signals of the dispersive filter of the first channel and of the second additional frequency translating means of said last $(n-1)$ channels; and a detector.

5. A radar station comprising in series: means for generating, at an initial frequency level, a constant amplitude pulse which is linearly frequency modulated according to an increasing law as a function of time; means for translating said pulse to at least one intermediate frequency level; means for subsequently translating said pulse to a high frequency level; means for sending said pulse on the air and collecting it as an echo from a target; means for bringing back said collected pulse to an intermediate frequency level; a $n$-branch parallel circuit, where $n$ is an integer greater than 1, the first of said branches comprising means operating at said last mentioned intermediate frequency level for imparting to said collected pulse a delay equal to $(n-1)$ $n$th of its duration, means for bringing back said collected pulse substantially to said initial frequency level, a low pass filter selecting substantially the first $n$th of said collected pulse, and a dispersive filter; each $i$th branch where $2 \leqslant i \leqslant n-1$ comprising delay means operating at said last mentioned intermediate frequency level for imparting to said collected pulse a delay equal to $(n-i)$ $n$th of its duration, means for bringing back said pulse substantially to said initial frequency level, a band-pass filter selecting substantially the $i$th $n$th of said collected pulse, first additional frequency translating means for bringing the instantaneous frequency range of said $i$th $n$th of said collected pulse substantially into coincidence with the instantaneous frequency range of said first $n$th, a dispersive filter, second additional frequency translating means for effecting the frequency translation opposite to that effected by said first supplementary frequency translating means; said $n$th branch comprising means for bringing back said collected pulse substantially to said initial frequency level, a high pass-filter for selecting substantially the $n$th $n$th of said pulse, first additional frequency translating means for bringing the instantaneous frequency range of said $n$th $n$th of said collected pulse substantially into coincidence with said instantaneous frequency range of said first $n$th of said collected pulse, a dispersive filter, second additional frequency translating means for effecting the frequency translation opposite to that effected by said first additional frequency translating means of said $n$th branch; an adder for adding the output signals of said $n$ branches and a detector.

6. A radar station comprising:
means for generating at an initial frequency level $p$ constant amplitude linearly frequency modulated pulses $J_1, J_2 \ldots$ and $J_p$, $p$ being any integer; said pulses being frequency linearly modulated as a function of time according to laws where the cofficients of the time $t$ are respectively $k_1, k_2 \ldots k_p$;
$p$ transmitting channels each comprising: means for translating a corresponding one of said pulses to at least one intermediate frequency level and subsequently to a high frequency level, the total frequency translations in the $p$ transmitting channels being respectively $\Omega_1, \Omega_2 \ldots$ and $\Omega_p$, said frequencies $\Omega_1, \Omega_2 \ldots \Omega_p$ being selected such that $\Omega_1/k_1 = \Omega_2/k_2 = \ldots \Omega_p/k_p$;
means coupled to said $p$ transmitting channels for sending on the air said pulses $J_1, J_2 \ldots$ and $J_p$ and collecting them as reflected echoes from a target;
$p$ receiving channels coupled to said sending and collecting means, each of said receiving channels comprising in series: frequency translating and selecting means for selecting a corresponding one of said $p$ pulses and bringing it back to an intermediate frequency level, a $n$-branch parallel circuit, where $n$ is any integer greater than one; the first of said $n$ branches comprising means operating at said last mentioned intermediate frequency level for imparting to said selected pulse a delay equal to $(n-1)$ $n$th of its duration; frequency translating means for bringing back said selected pulse substantially to said initial frequency level, and a dispersive filter; each $i$th branch, $2 \leq i \leq n$ comprising delay means operating at said last mentioned intermediate frequency level for imparting to said selected pulse a delay equal to $(n-i)$ $n$th of its duration, frequency translating means for bringing back said selected pulse substantially to said initial frequency level, a band-pass filter for selecting the $i$th $n$th of said selected pulse, first supplementary frequency translating means for bringing the instantaneous frequency range of said $i$th $n$th substantially into coincidence with the instantaneous frequency range of said first $n$th, a dispersive filter, and second supplementary frequency translating means for effecting the frequency translation opposite to that effected by said last mentioned first supplementary frequency translating means; said $n$th branch comprising frequency translating means for bringing back said selected pulse substantially to said initial frequency level, a high pass-filter for selecting the $n$th $n$th of said selected pulse, first supplementary frequency translating means for bringing the instantaneous frequency range of said $n$th $n$th substantially into coincidence with the instantaneous frequency range of said first $n$th, a dispersive filter, and second supplementary frequency translating means for effecting the frequency translation opposite to that effected by said last mentioned first supplementary frequency translating means; an adder for adding the output signals of said $n$ branches; and a detector coupled to said adder;
and correlating means coupled to said detectors of said $p$ receiving channels.

7. A radar station comprising: means for generating at an initial frequency level $p$ pulses $J_1, J_2 \ldots$ and $J_p$, $p$ being an integer greater than one, said pulses being linearly frequency modulated as a function of time according to respective laws where the coefficient of the time $t$ are respectively $k_1, k_2 \ldots$ and $k_p$; $p$ transmitting channels, each comprising frequency translating means for operating respectively on said $p$ pulses frequency translations bringing them to a high frequency level, the total frequency translations operated in each of said $p$ transmitting channels being respectively equal to $\Omega_1, \Omega_2 \ldots \Omega_p$, said frequencies $\Omega_1, \Omega_2 \ldots \Omega_p$ being selected to have $\Omega_1/k_1 = \Omega_2/k_2 = \Omega_p/k_p$; means coupled to said $p$ transmitting channels for sending on the air said $p$ pulses and receiving them as reflected echoes from a target; $p$ receiving channels coupled to said sending and collecting means, said channels comprising means for respectively selecting one of said pulses, means including a dispersive filter for compressing said selected pulse and a detector; and correlating means coupled to said receiving channels.

References Cited by the Examiner
UNITED STATES PATENTS 2,435,615   2/1948   Varian et al. _________ 343—9
2,678,997   5/1954   Darlington.

RODNEY D. BENNETT, *Primary Examiner.*

CHESTER L. JUSTUS, *Examiner.*

L. H. MYERS, R. E. KLEIN, J. P. MORRIS,
                         *Assistant Examiners.*